Oct. 31, 1950     M. Q. WEBB     2,527,863
MODIFICATION AND DYEING OF ACRYLONITRILE POLYMERS
Filed Aug. 29, 1947
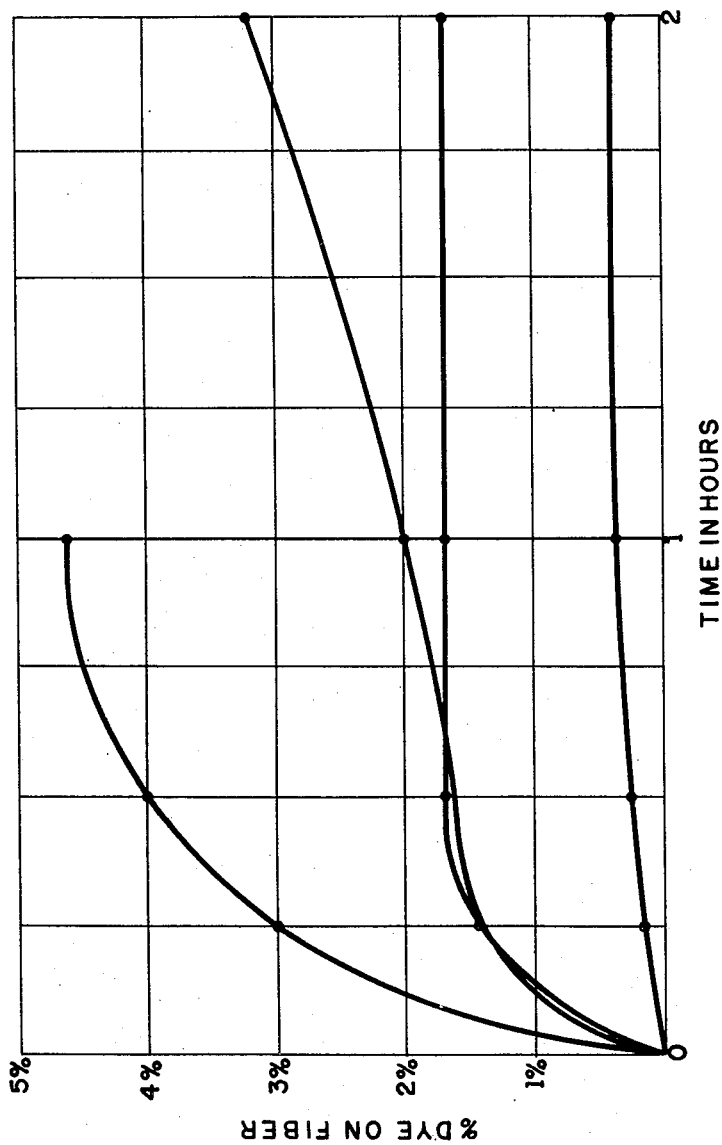
INVENTOR.
MYRON QUENTIN WEBB
BY
ATTORNEY Patented Oct. 31, 1950

2,527,863

UNITED STATES PATENT OFFICE 2,527,863

MODIFICATION AND DYEING OF ACRYLONITRILE POLYMERS

Myron Q. Webb, Staunton, Va., assignor to E. I. du Pont de Nemours & Company, Wilmington, Del., a corporation of Delaware Application August 29, 1947, Serial No. 771,243

10 Claims. (Cl. 18—47.5)

This invention relates to the modification of polymers of acrylonitrile. More particularly, it relates to new compositions prepared from acrylonitrile polymers and to new methods of dyeing structures comprising acrylonitrile polymers.

By "structures" is meant shaped articles, such as yarns, films, bristles, fabrics, tubings, molded articles and the like, and by "acrylonitrile polymers" is meant those polymers containing at least 85% by weight of acrylonitrile.

Acrylonitrile polymers containing a major portion of acrylonitrile are relatively insoluble, unreactive and hydrophobic materials. These characteristics make the dyeing of structures prepared from such polymers a difficult problem. Indeed, standard commercial dyeing techniques cannot be used satisfactorily. For example, only light shades are obtained on dyeing structures of polyacrylonitrile with dispersed acetate, basic and certain vat colors. This is true for copolymers of acrylonitrile prepared using up to 15% of other vinyl type monomers other than that of this invention. These copolymers retain the desirable properties of polyacrylonitrile and show only a slightly enhanced dye receptivity. Since the physical and chemical properties of shaped articles prepared from acrylonitrile polymers make the articles of considerable commercial interest, solutions to the difficult dyeing problems are highly desirable.

Accordingly, it is an object of this invention to provide a satisfactory process for dyeing structures prepared from acrylonitrile polymers. A further object is the provision of acrylonitrile polymer compositions from which readily dyeable fibers, yarns, fabrics and the like can be prepared. A still further object is the provision of a method for readily dyeing articles shaped from acrylonitrile polymers. Other objects are described hereinafter.

The objects of this invention are accomplished by modifying acrylonitrile polymers with polyvinylpyridines prior to the formation of the structures, forming the shaped articles and then dyeing the articles. The acrylonitrile polymers may be blended with up to 10% of a polyvinylpyridine without any appreciable change in the desirable physical and chemical properties and the resultant dyed structures have yarn color far superior to that of dyed articles prepared from unmodified acrylonitrile polymers.

The following examples, which illustrate but do not limit the invention and in which parts, proportions and percentages are by weight unless otherwise specified, describe preferred modes of operating in accordance with the principles of the invention.

The accompanying figure is a graphic comparison of the rate of dyeing of a readily dyeable article prepared by the process of this invention, the dyeing being done with four dyes of different molecular weights.

EXAMPLE I

A polymer solution containing 24% solids was prepared in the following manner: 18.5 parts of poly-2-vinylpyridine was dissolved in 200 parts of dimethylformamide. This solution was heated to 130° C. and allowed to stand overnight at room temperature after which time it was filtered to remove sediment. To the filtrate was added 1030 parts of dimethylformamide and 370 parts of polyacrylonitrile. The resultant mixture was stirred at room temperature and the slurry formed was heated at 135° C. for 1¼ hours. The solution so formed was allowed to rest for 45 minutes and was then used for dry spinning yarns.

The spinning was accomplished by extruding the solution at a temperature of 140° C. through a 10-hole spinneret (hole diameter of 0.125 inch) downward through a heated air cell, 6 inches in diameter and 9 feet in length. Air heated to 90° C. was passed at a rate of 15 cubic feet per minute into the cell counter-current to the coagulating yarn and was removed from the cell at a temperature of 193° C. The yarn was wound up at a rate of 133 yards per minute. The yarn was drawn 7 to 9 times its original length at 130° C. to 190° C. and was then relaxed 19% at 200° C. Samples of yarn were dyed at the boil at 40:1 bath to yarn ratio in the presence of 2% sulfuric acid based on the fabric. The dyes used were:

Dye No. 1: Anthranilic acid→1-(4'-sulfophenyl)-3-methyl-5-pyrazolone

Dye No. 2: 1,5-diamino-4,8-dihydroxyanthraquinone-3-sulfonic acid

Dye No. 3: 1 - aminonaphthalene - 4 - sulfonic acid→alpha-naphthol-4-sulfonic acid In Table I below are given percentage exhaust figures for equilibrium 1% dyeing of the above three dyes on the fiber prepared from the polyacrylonitrile/polyvinylpyridine blend and the comparative figures for unmodified polyacrylonitrile fiber.

TABLE I

| Yarn Composition | Exhaust Values | | |
|---|---|---|---|
| | Dye No. 1 | Dye No. 2 | Dye No. 3 |
| | Per cent | Per cent | Per cent |
| Polyacrylonitrile | 0 | 0 | 0 |
| Polyacrylonitrile/Polyvinylpyridine (95/5) | 86 | 95 | 98 |

From these figures it can readily be seen that the new compositions of this inventon are much more readily dyed than articles prepared from unmodified poylacrylonitrile. The other physical properties of the new, dyed structures are comparable to those of similar unmodified polyacrylonitrile fibers.

EXAMPLE II

One part of a flat fabric prepared from a yarn containing 95 parts of polyacrylonitrile and 5 parts of poly-2-vinylpyridine was dyed with a direct color, namely, the sodium salt of sulfanilic acid → aniline → 2 - benzoylamino - 5 - naphthol-7-sulfonic acid. Dyeing was effected using a bath containing 0.05 part (5%) dye, 0.02 part (2%) sulfuric acid, 40 parts of water (40:1 bath-fiber ratio), and a temperature of 98° C. or at the boil. Immersion time was two hours. The sample was washed in water and allowed to dry. It was dyed to a medium to strong red shade. Under similar conditions, a flat fabric prepared from unmodified polyacrylonitrile had no coloration.

EXAMPLE III

A knit tubing was prepared using a yarn containing 95 parts of polyacrylonitrile and 5 parts of poly-2-vinylpyridine. This yarn was prepared in a manner similar to that described in Example I. The knit tubing was immersed for one hour at the boil (97-98° C.) in a bath containing 0.05 part (5%) of the sodium salt of 4,4' - diaminostilbene - 2,2' - disulfonic acid → (phenol)$_2$ ethylated a direct color, 0.04 (4%) acetic acid, 0.8 part (2% based on the weight of the bath) of m-cresol and 40 parts of water (40:1 bath-fiber ratio). The knit tubing was rinsed thoroughly in hot water to remove the m-cresol. By this treatment a strong yellow shade was obtained, whereas under similar conditions knit tubing prepared from polyacrylonitrile yarn was not dyed at all.

EXAMPLE IV

An approximately 95/5 blend of a copolymer (95/5) of acrylonitrile and methacrylic acid was prepared with polyvinylpyridine as a 25% solution in dimethyl formamide according to the following formula:

| | Parts |
|---|---|
| Acrylonitrile/methacrylic acid copolymer | 400 |
| Poly-2-vinylpyridine | 20 |
| Dimethyl formamide | 1200 |

The solution was effected exactly as described in Example I. A yarn was prepared from this blend by dry spinning the polymer solution in the same apparatus and under the same conditions as the blend descibed in Example I. This yarn was drawn 9 times its original length at 150° C., relaxed 19% at 200° C., and then heat-treated on the cone for four hours at 80° C.

One part of the yarn prepared as described above, in skein form, was dyed in a bath containing 0.05 part (5%) of an acid dye known as 1,5-diamino-4,8-dihydroxyanthraquinone-3-sulfonic acid, 0.03 part (3%) sulfuric acid and 50 parts water (50:1 bath-fiber ratio). Immersion period was one hour and the temperature was at the boil or 97-98° C. The sample was removed and washed well with water and scoured for 10 minutes in 0.5% soap solution at 82° C. The skein was dyed to a strong blue shade. In comparison, a skein of yarn prepared from a copolymer of acrylonitrile and methacrylic acid (95/5) dyed under similar conditions had no coloration.

EXAMPLE V

One part of a film prepared from 90/10 copolymer of acrylonitrile and methacrylic acid was treated in a bath containing an acid dye and, at the same time, one part of a film prepared by blending the 90/10 copolymer of acrylonitrile and methacrylic acid with 5% of poly-5-ethyl-2-vinylpyridine was dyed in the same bath. The bath contained 0.05 part (5%) of a dye prepared by diazotizing 1-aminonaphthalene-4-sulfonic acid and then coupling with alpha-naphthol-4-sulfonic acid, 0.03 part (3%) sulfuric acid and 50 parts water (50:1 bath-fiber ratio). The films were treated for one hour at 97-98° C. The samples were washed well with water. It was found that the poly-5-ethyl-2-vinylpyridine modified film was dyed to a strong red shade, whereas the unmodified film had no coloration.

EXAMPLE VI

Ninety-five parts of a copolymer of acrylonitrile and styrene (95/5) was blended with five parts of poly-2-vinylpyridine by dissolving both polymers in dimethyl formamide, making a 20% solution. A yarn was prepared from this blend by dry spinning the polymer solution as previously described. The yarn, after drawing, relaxing, and heat-treating, was quite satisfactory for textile use. One part of this yarn, in skein form, was dyed in a bath containing 0.05 part (5%) of an acid dye known as 1,5-diamino-4,8-dihydroxyanthraquinone-3-sulfonic acid, 0.03 part (3%) sulfuric acid and 50 parts water (50:1 bath-fiber ratio) for one hour at 97-98° C. The yarn sample was then washed well with water and scoured for 10 minutes in 0.5% soap solution at 80° C. The skein was dyed to a strong blue shade. Yarn prepared from the 95/5 copolymer of acrylonitrile and styrene, without blending with polyvinylpyridine, was not colored when dyed under similar conditions.

EXAMPLE VII

Knit tubing was prepared from a yarn sample of 95/5 copolymer of acrylonitrile and acrylic acid. A portion of the same copolymer was blended as described above so that it contained 5% poly-2-methyl-5-vinylpyridine. The blend was then converted to yarn and knit tubing. One part samples of the modified and unmodified yarn were dyed in a bath containing 0.05 part (5%) of a direct color, namely, the sodium salt of (m-aminobenzoic acid→o-anisidine) phosgenated, 50 parts water (50:1 bath-fiber ratio) and 0.02 part (2%) of sulfuric acid for one hour at the boil (97-98° C.). After this treatment, the samples were removed and washed with water and dried. The knit tubing containing the poly-2-methyl-5-vinylpyridine was dyed to a medium yellow shade whereas the knit tubing prepared from unmodified copolymer had no coloration.

EXAMPLE VIII

Similar samples of knit tubing described in Example VII were dyed in a bath containing 0.05 part (5%) of a different direct color, namely, the sodium salt of (2-naphthol-6,8-disulfonic acid←benzidine→phenol) ethylated. In addition, the bath contained 1.0 part of m-cresol (2% based on the bath), 0.04 part (4%) acetic acid and 50 parts of water (50:1 bath-fiber ratio). The samples were immersed in the bath for one hour, the bath temperature being 97–98° C. After this treatment, the samples were washed in hot water to remove the m-cresol and were scoured for 10 minutes at 82° C. using a 0.5% soap solution. Again, it was found that the knit tubing containing no polyvinylpyridine had no coloration, whereas the knit tubing prepared from the copolymer/poly-2-ethyl-5-vinylpyridine blend was dyed to a medium scarlet shade. Under similar conditions, the knit tubing treated in the absence of m-cresol was found to be dyed only to a weak shade.

EXAMPLE IX

This example illustrates the dyeing of new compositions of matter of this invention with vat colors. Five parts of a skein of yarn prepared using a 95/5 copolymer of acrylonitrile and methacrylic acid and 5% of poly-2-vinylpyridine was dyed at 71° C. for one hour in a vat prepared from 0.5 part (10%) of a vat color, dimethoxy-dibenzanthrone, 0.25 part (5%) sodium hydroxide, 0.5 part (10%) sodium hydrosulfite and 100 parts water (20:1 bath-fiber ratio). After the first 20 minutes of heating, 0.25 part (25%) of Glauber's salt was added. The sample was oxidized in a sodium dichromate/acetic acid bath (0.5% sodium dichromate, 1.0% acetic acid, 20:1 bath-fiber ratio) for 30 minutes at 71° C. The skein was then scoured in a 0.5% soap solution for 30 minutes at the boil (97–98° C.). It was dyed to a strong green shade. A similar sample of yarn prepared from unmodified 95/5 acrylonitrile/methacrylic acid copolymer was dyed under the same conditions only to a medium shade.

EXAMPLE X

A one part sample of a flat fabric prepared from a yarn containing 5% of poly-2-vinylpyridine and 95% of 95/5 copolymer of acrylonitrile and methacrylic acid was dyed using a vat dye which has 1,5-di-p-anisoylamino-4,8-dihydroxyanthraquinone. The vat was prepared from 0.1 part (10%) of dye, 0.05 part (5%) sodium hydroxide, 0.1 part (10%) sodium hydrosulfite and 20 parts of water (20:1 bath-fiber ratio). The bath was used at a temperature of 71° C. and the flat fabric was immersed in the bath for one hour. After the first 20 minutes of heating, 0.25 parts (25%) of Glauber's salt was added. The sample was oxidized in a sodium dichromate/acetic acid bath (0.5% sodium dichromate, 1.0% acetic acid, 20:1 bath-fiber ratio) for 30 minutes at 71° C. and scoured in a 0.5% soap solution for 30 minutes at the boil (97–98° C.). The fabric obtained was dyed to a strong violet shade. In contrast, a fabric prepared from unmodified acrylonitrile/methacrylic acid copolymer (95/5) yarn was dyed under these conditions only to a medium shade.

EXAMPLE XI

This example illustrates the dyeing of certain new compositions of matter of this invention with a sulfur color. A blend containing 5% poly-2-vinylpyridine and 95% of a 95/5 copolymer of acrylonitrile and methacrylic acid was converted to a knit tubing. A one-part amount of the tubing was dyed with the after-oxidized thionation product of 4-hydroxy-3'-methyl-4'-aminodiphenylamine in a bath containing 0.05 part (5%) of the dyestuff, 0.06 part (6%) sodium sulfide, 0.02 part (2%) sodium carbonate, and 20 parts of water (20:1 bath-fiber ratio). The treatment lasted for 50 minutes and the bath temperature was 82° C. At intervals during the dyeing period, 0.3 part (30%) of sodium chloride was added. The sample was rinsed in cold water and oxidized in a sodium dichromate-acetic acid bath (2% dichromate, 4% acetic acid, 20:1 bath-fiber ratio) for 25 minutes at 60° C. After this treatment the dyed tubing was scoured in a 0.5% soap solution for 10 minutes at 82° C. The dyeing done in this manner led to a strong shade. On the other hand, a similar sample of tubing containing no polyvinylpyridine was colored to a very much lighter shade when treated in a similar manner.

The acrylonitrile polymers which are generally used commercially must, of course, be of a sufficiently high molecular weight to possess film- or filament-forming properties in order for them to be useful in the formation of structures. The polymers employed possess an average molecular weight within the range of 25,000 to 750,000 or even higher, and preferably within the range of 40,000 to 250,000 as calculated from viscosity measurements of the Staudinger equation.

$$\text{Molecular weight} = \frac{N_{sp}}{K_m C}$$

wherein:

$K_m = 1.5 \times 10^{-4}$ $N_{sp} = \text{specific viscosity} = \dfrac{\text{viscosity of solution}}{\text{viscosity of solvent}} - 1$ and $C$ = concentration of the solution expressed as the number of mols of monomer (calculated) per liter of solution It is to be understood, however, that acrylonitrile polymers having molecular weights below or above the range indicated may be subjected successfully to the process of this invention. Thus, this invention contemplates the use of any acrylonitrile polymer in forming the new compositions with polyvinylpyridines.

The acrylonitrile polymers which are generally employed commercially are those containing at least 85% by weight of the polymer of acrylonitrile. These polymers include polyacrylonitrile, and copolymers and interpolymers of acrylonitrile with other polymerizable monomers. These monomers include, among others, vinyl acetate, vinyl chloride, esters or other derivatives of acrylic or methacrylic acids, styrene, methyl vinyl ketone, isobutylene or other similar polymerizable hydrocarbons. In general, it is preferred to use interpolymers and copolymers containing no more than 15% of the aforesaid monomers. However, polymers containing less than 85% of acrylonitrile may be employed in forming the new compositions of matter of this invention. Thus, the polyvinylpyridines of this invention can be blended with polyacrylonitrile and any of its copolymers and interpolymers.

The polyvinylpyridine is obtained by polymerization of 2-vinylpyridine or similarly substituted pyridines. Any of the polyvinylpyridines described in U. S. 2,402,020, U. S. 2,388,477, German 695,098, French 849,126 or in copending U. S. application Serial No. 653,141, now abandoned may be used in this invention. For example, poly-5-ethyl-2-vinylpyridine, poly-5-methyl-2-vinylpyridine, poly-2-methyl-5-vinylpyridine or similar homologues can be used in this invention. Likewise, copolymers and interpolymers of vinylpyridines containing major portions of the vinylpyridine may be employed, such as interpolymers with butadiene and similar polymerizable hydrocarbons. The molecular weight of the vinylpyridine polymer is not critical.

The blends of polyvinylpyridine and acrylonitrile polymers, which are new compositions and are of direct and related importance in the dyeing process of this invention, can be prepared in any convenient way. Solvent blending can be accomplished, as described above, using solvents such as dimethyl formamide, tetramethylene cyclic sulfone, or any of the solvents disclosed in such patents as U. S. 2,404,714 to 2,404,727, inclusive. For the most part, these reagents are solvents for both the acrylonitrile and vinylpyridine polymers. The solutions of acrylonitrile polymers prepared using such solvents and 10% of a polyvinylpyridine are occasionally hazy, but no difficulty in the standard spinning techniques is encountered. Compatibility of the blends of polyacrylonitrile with polyvinylpyridine can be improved greatly by adding up to 10%, based on the weight of the polyvinylpyridine, of maleic acid or maleic anhydride. This modification leads to the production of more uniform articles. The acrylonitrile polymers and polyvinylpyridines can be blended in the dry state also.

When yarns are to be produced, the preferred concentration of the spinning solution is dependent upon the average molecular weight of the polymer employed. It is generally more desirable to use dilute solutions in the spinning of polymers of high molecular weight. In general, it is preferred that the solution contain from 10-30% total solids. A solution containing 24% total solids of a blend of a polyvinylpyridine with an acrylonitrile polymer possessing an average molecular weight of 60,000-120,000 is admirably suited for use in this invention. When the solution is to be extruded through a conventional type orifice, it should preferably possess a viscosity of from 50 to 500 poises, this viscosity being obtained by properly adjusting the temperature of the solution prior to extrusion. In general, solution temperatures of from 100° C. to 150° C. are preferred.

On leaving the spinning cell the yarn is collected in a suitable package and this yarn package may then be washed free of any residual solvent, such as dimethyl formamide. In order to obtain full benefit of the properties of yarns prepared from blends of acrylonitrile polymers and polyvinylpyridine, it is desirable to draw the yarn from 2 to 10 times its original length. Moreover, when heated under tension for extended periods of time the yarns show a remarkable retention of tenacity; while, on the other hand, if the yarns after drawing are heated in a relaxed state to temperatures of the order of 130° C. to 200° C. the yarns tend to shrink somewhat and such an after-treatment can be used to increase the elongation of the yarn to a point where they are satisfactory for use in the textile art.

The structures, such as yarns, films, fabrics and the like may be prepared by the usual techniques. For example, yarns or fibers may be prepared, as described above, by dry spinning or they may be prepared by wet spinning according to such procedures described in copending applications 496,376, now U. S. Patent No. 2,426,719, 735,666, now U. S. Patent No. 2,451,420 or 746,651, now U. S. Patent No. 2,467,553. Films may be prepared in similar ways, or by casting techniques. Fabrics of the new compositions of matter of this invention may be prepared by any of the well-known knitting or weaving techniques.

Normally, structures prepared from acrylonitrile polymers cannot be dyed satisfactorily with any dye, such as acid, direct, sulfur, acetate, basic or vat colors. At best, only light shades are obtained with dispersed acetate, basic and certain vat dyes in standard processes. Satisfactory dyeing can be obtained using dispersed acetate and basic dyes by using m-cresol as a carrier. By the process of this invention it is possible to obtain satisfactory dyeing with acid, direct, sulfur and vat colors. When using direct colors or acid colors of relatively high molecular weight, it is preferred to incorporate approximately 2% of m-cresol, based on the weight of the bath, as a carrier. It is preferred to use acid or direct dyes. In addition to those dyes mentioned in the above examples, the following dyes can be used satisfactorily to produce the dyed structures of this invention:

Sodium salt of sulfanilic acid→resorcinol← m-xylidine,

Sodium salt of p-nitroaniline $\xrightarrow{\text{acid}}$ 1-amino-8-naphthol-3,6-disulfonic acid←aniline, Sodium salt of 4-sulfo-2-aminotoluene→2-naphthol, Sodium salt of o-anisidine→1-naphthol-4-sulfonic acid, Sodium salt of 1-amino-8-naphthol-3,6-disulfonic acid→1-phenylaminonaphthalene-8-sulfonic acid, Sodium salt of 4-acetylamino-1-aminobenzene→8-acetylamino-1-naphthol-3,6-disulfonic acid, Sodium salt of 4-sulfo-1-aminonaphthalene→1-naphthol-5-sulfonic acid, Sodium salt of 1-amino-2-naphthol-4-sulfonic acid→1-phenyl-3-methyl-5-pyrazolone, Ferric sodium salt of 1-nitroso-2-naphthol-6-sulfonic acid, and Sodium salt of sulfanilic acid→salicylic acid ←p-nitroaniline.

The amount of dye used will depend upon the extent of dyeing desired and can be varied between wide limits. The new compositions of matter of this invention may be dyed in any convenient manner. Conventional dyeing apparatus and procedures, such as purification methods, may be used. Commercial dyeing procedures usually employ 20:1 to 50:1 bath-fiber ratios. These ratios may be used satisfactorily in this invention.

The rate of dyeing is dependent on the nature of the dye as well as upon the nature of the blend. For example, the molecular weight of the dye is important in the rate of dyeing but is not critical. The figure illustrates this point. A blend of polyacrylonitrile (95%) and polyvinylpyridine (5%) was prepared and converted to fibers as described above. Four skeins were dyed separately under similar conditions except that a different dye was used in each case. The bath was an aqueous bath containing 5% of the dye based on the weight of the fiber and 40 parts of water to 1 part of the structure. The dyeing was done at a temperature of 97° C. These dyes were:

A: 1,5 diamino-4,8-dihydroxyanthraquinone-3-sulfonic acid
B: 1-aminonaphthalene-4-sulfonic acid→1-hydroxynaphthalene-4-sulfonic acid
C: 2-hydroxynaphthalene-6,8-disulfonic acid←benzidine→phenol+p-tolylsulfonyl chloride
D: 1-hydroxy-8-aminonaphthalene-5,7-disulfonic acid←2,2' - dimethoxybenzidine→1-hydroxy-8-aminonaphthalene-5,7-disulfonic acid It will be noted from a study of the figure that the rate with the smallest dye, Dye A, was satisfactory for commercial dye-house practice (4% shade in 1 hour) even in the absence of a dye assistant. The next larger dye, Dye B, dyed the fiber considerably more slowly and very heavy shades are difficult to obtain except in the presence of an assistant, such as meta-cresol. With 2% (based on the bath) of this compound in the dyebath the rate of dyeing was comparable to that of Dye A. The third dye, Dye C, did not dye the fiber to any great extent except in the presence of meta-cresol. But again, with the assistant the rate was fairly rapid. However, the rate of Dye D, a large direct dye, was low and the dye gave only light shades even in the presence of m-cresol.

As would be expected from these results, it was found in general practice that the low molecular weight level-dyeing acid colors, including prechromed colors, satisfactorily dyed structures prepared from blends of acrylonitrile polymers and vinylpyridine polymers at a reasonable rate at the boil in the absence of an assistant, while the milling acid colors and direct cotton dyes only stained the surface of the yarn. Thus, while dyeing does occur with dyes of relatively high molecular weight, it is preferred to use low molecular weight dyes, although the invention is not limited to such dyes. In the presence of 2% meta-cresol all of the acid dyes and most of the direct dyes will dye the structures rapidly and with complete penetration.

When the dyeing experiments were carried out in the presence of excess dye for as long as 6 to 8 hours, close-to-saturation dyeings were obtained. The following Table II illustrates the improvement in dye take-up of yarns prepared from polyacrylonitrile modified with polyvinylpyridine. Similar results were obtained for other acrylonitrile polymers.

TABLE II

*Dye take-up*

| Dye | Polyacrylonitrile | 95% Polyacrylonitrile, 5% Polyvinylpyridine | 97.5% Polyacrylonitrile, 2.5% Polyvinylpyridine |
|---|---|---|---|
| | Per cent | Per cent | Per cent |
| A | 0 | 13 | 6.5-7 |
| B | 0 | 7.5 | 4 |
| C | 0 | 8 | 5 |
| D | 0 | 2 | 1.5 |

From the above table, it can be seen that the polyacrylonitrile fiber modified by 2.5% of polyvinylpyridine showed about half the basicity of the polyacrylonitrile fiber which contained twice as much polyvinylpyridine. It appears that polyacrylonitrile fibers modified with 5% polyvinylpyridine have a high enough saturation value with most acid dyes for almost any use. However, it is felt that a reduction in polyvinylpyridine content much below 2% might result in too low a saturation value and might also accentuate junction difficulty. It is preferred to use no more than 10% amounts of polyvinylpyridine based on the weight of the acrylonitrile polymers. In certain instances higher amounts may be tolerated. Generally, if amounts substantially greater than 10% are used, the shaped articles tend to lose some of the desirable characteristics of the acrylonitrile polymers. In general, amounts of the polyvinylpyridine varying from 2 to 10% will be preferred.

The wash-fastness of the acrylonitrile polymer/polyvinylpyridine structures dyed with acid colors is comparable to that of nylon and better than that of wool. For example, with the various acid dyes at 60° C. in a 0.5% soap solution, no bleed was noted from the polyacrylonitrile fiber modified with 5% polyvinylpyridine. At 80° C. certain fibers lost only small amounts of some acid dyes and at the boil all of the fibers still held many of the colors satisfactorily.

It is known in the art that hydrophobic polymeric materials may be made more dye receptive by incorporation of hydrophilic substances. Such modification leads to structures which swell in water and can, therefore, be dyed more readily. In general, this technique is inapplicable to hydrophobic acrylonitrile polymers. For example, incorporation of hydrophilic substances such as polyethyleneimine, aminated polyglycides, polyethylene guanidine, polyhexamethylene guanidine, and the more soluble polyamides into acrylonitrile polymers does not lead to dyed structures having satisfactory over-all properties. In view of this, it is surprising that such outstanding results are obtained with polyvinylpyridines.

In improving dyeing by blending hydrophilic materials with acrylonitrile polymers one generally obtains a structure, for example, a yarn which has poor physical properties such as tensile strength, toughness, yarn color, solubility, resistance to acids, bases and ultraviolet, and light fastness when dyed. The desirable properties of the initial polymers are sacrificed. While some improvement in dye receptivity is obtained by polymerizing acrylonitrile with such monomers as acrylic acid, the degree of improvement is insufficient. For the preparation of structures having the desirable properties of articles prepared from acrylonitrile, such as high tenacity, elongation and chemical inertness toward acids and solvents, etc., it is preferred to use at least 85% by weight of the acrylonitrile in the preparation of the copolymers and interpolymers. These copolymers and interpolymers, like polyacrylonitrile, cannot be dyed satisfactorily by commercial dyeing techniques, but can be readily dyed upon the application of the process of this invention.

The new compositions and the processes of this invention have many advantages. Structures prepared according to this invention have good yarn color and light fastness. The new compositions of matter of this invention are dyed throughout and not merely on the surface. Great resistance to wear by scuffing, scratching, and the like advantageously results. Further, the structures are susceptible to dyeing by a greater variety of dyes than are the corresponding unmodified structures. For example, fibers prepared from a 95/5 copolymer of acrylonitrile and methacrylic and blended with 5% of a polyvinylpyridine can be satisfactorily dyed with acetate, basic, vat colors including solubilized vat colors, acid and prechromed acid colors, direct, and sulfur colors, whereas the structures prepared from the unmodified copolymer can be dyed only with dispersed acetate, basic, and certain vat colors and only in an unsatisfactory manner.

Heretofore, acrylonitrile polymer structures could not be dyed satisfactorily by standard commercial practice. By this invention a convenient and valuable method for preparing readily dyeable acrylonitrile polymer structures is made available. The dyeability of the compositions of this invention is far superior to that of the corresponding unmodified acrylonitrile polymers. The structures prepared in accordance with this invention possess physical and chemical properties which are comparable to those of structures prepared from the corresponding unmodified acrylonitrile polymers.

Any departure from the above description which conforms to the present invention is intended to be included within the scope of the claims.

I claim:

1. As a new composition of matter, a structure comprising an acrylonitrile polymer containing at least 85% of acrylonitrile and a polyvinyl pyridine present in amounts no more than 10%, based on said acrylonitrile polymer.

2. As a new composition of matter, a dyed structure comprising an acrylonitrile polymer containing at least 85% of acrylonitrile and a polyvinyl pyridine present in amounts no more than 10%, based on said acrylonitrile polymer.

3. As a new composition of matter, a structure comprising polyacrylonitrile and a polyvinyl pyridine present in amounts no more than 10% of the weight of said polyacrylonitrile.

4. As a new composition of matter, a structure comprising a copolymer of acrylonitrile and methacrylic acid containing at least 85% by weight of acrylonitrile and a polyvinyl pyridine present in amounts no more than 10% of the weight of said copolymer.

5. As a new composition of matter, a structure comprising a copolymer of acrylonitrile and styrene containing at least 85% by weight of acrylonitrile and a polyvinyl pyridine present in amounts no more than 10% of the weight of said copolymer.

6. A method of forming a dyed structure comprising blending an acrylonitrile polymer containing at least 85% of acrylonitrile with a polyvinyl pyridine used in amounts no more than 10% of weight of the said acrylonitrile polymer; forming said structure from the resultant blend; and treating said structure with an aqueous bath containing an acid dye.

7. A method of forming a dyed structure which comprises blending an acrylonitrile polymer containing at least 85% of acrylonitrile with a polyvinyl pyridine used in amounts no more than 10% of the weight of the said acrylonitrile polymer; forming said structure from the resultant blend; and treating said structure at a temperature above 85° C. with an aqueous bath containing an acid dye.

8. A method of forming a dyed structure which comprises blending polyacrylonitrile with a polyvinyl pyridine used in amounts no more than 10% of the weight of said polyacrylonitrile; forming said structure from the resultant blend; and treating said structure with an aqueous bath containing an acid dye.

9. A method of forming a dyed structure which comprises blending a copolymer of acrylonitrile and methacrylic acid containing at least 85% acrylonitrile with a polyvinyl pyridine used in amounts no more than 10% of the weight of the said interpolymer; forming said structure from the resultant blend; and treating said structure with an aqueous bath containing an acid dye.

10. A method of forming a dyed structure which comprises blending a copolymer of acrylonitrile and styrene containing at least 85% of acrylonitrile with a polyvinyl pyridine used in amounts no more than 10% of the weight of the said interpolymer; forming said structure from the resultant blend; and treating said structure with an aqueous bath containing an acid dye.

MYRON Q. WEBB.

REFERENCES CITED

The following references are of record in the file of this patent:

UNITED STATES PATENTS

| Number | Name | Date |
|---|---|---|
| 2,356,767 | Kropa | Aug. 29, 1944 |
| 2,426,719 | Watkins | Sept. 2, 1947 |
| 2,431,956 | Moody | Dec. 2, 1947 |